O. FRIESE & F. GRAAFEN.
APPARATUS FOR THE CONTINUOUS EXAMINATION OF LIQUIDS.
APPLICATION FILED APR. 11, 1911.

1,096,832.

Patented May 19, 1914.

3 SHEETS—SHEET 1.

O. FRIESE & F. GRAAFEN.
APPARATUS FOR THE CONTINUOUS EXAMINATION OF LIQUIDS.
APPLICATION FILED APR. 11, 1911.

1,096,832.

Patented May 19, 1914.

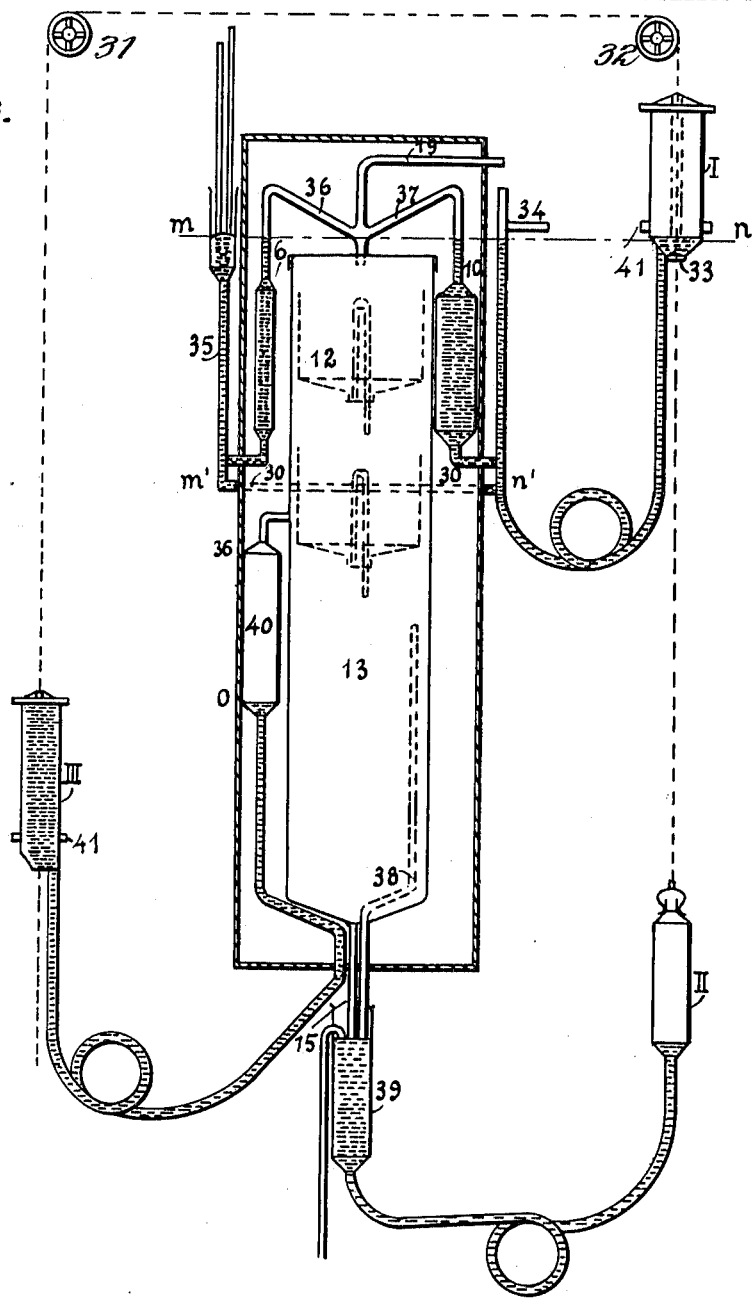

UNITED STATES PATENT OFFICE.

OTTO FRIESE, OF BERLIN, AND FERDINAND GRAAFEN, OF ERFURT, GERMANY, ASSIGNORS TO HYDRO-APPARATEBAUANSTALT (J. VON GELDERN & CO.), OF DUSSELDORF, GERMANY.

APPARATUS FOR THE CONTINUOUS EXAMINATION OF LIQUIDS.

1,096,832.   Specification of Letters Patent.   Patented May 19, 1914.

Application filed April 11, 1911. Serial No. 620,415.

*To all whom it may concern:*

Be it known that we, OTTO FRIESE, a citizen of the Kingdom of Prussia, and residing at No. 24 Tegeler Weg, Berlin, Germany, and FERDINAND GRAAFEN, a citizen of the Kingdom of Prussia, and residing at Blumenthalerstrasse 7, Erfurt, Germany, have invented certain new and useful Improvements in Apparatus for the Continuous Examination of Liquids, of which the following is a specification.

This invention has for its object to provide an improved apparatus for the continuous examination, measurement and recording of the amount of substances in solution or of the composition of liquids which are caused to evolve gases by corresponding reagents.

According to the invention certain quantities of the liquid to be examined which have been automatically measured by suitable devices, are mixed with measured quantities of a simple or a compound liquid reagent adapted to react on the liquid to be examined with generation of gas, the gas being then determined and recording either volumetrically or by measuring its heat of combustion or the generated heat of reaction, after which the mixing chamber is automatically emptied. The generated gas may also be led away periodically or continuously and its amount may be determined by a gas meter or by means of a velocity measurer according to the well known principle of measurement of differential pressures.

The operations set out above are carried into effect quite automatically in accordance with this invention, that is to say, all the various steps are caused to take place by a common and periodically acting mechanical driving power.

Several forms of the various apparatus are illustrated by way of example in the accompanying drawings, in which:—

Figure 1:
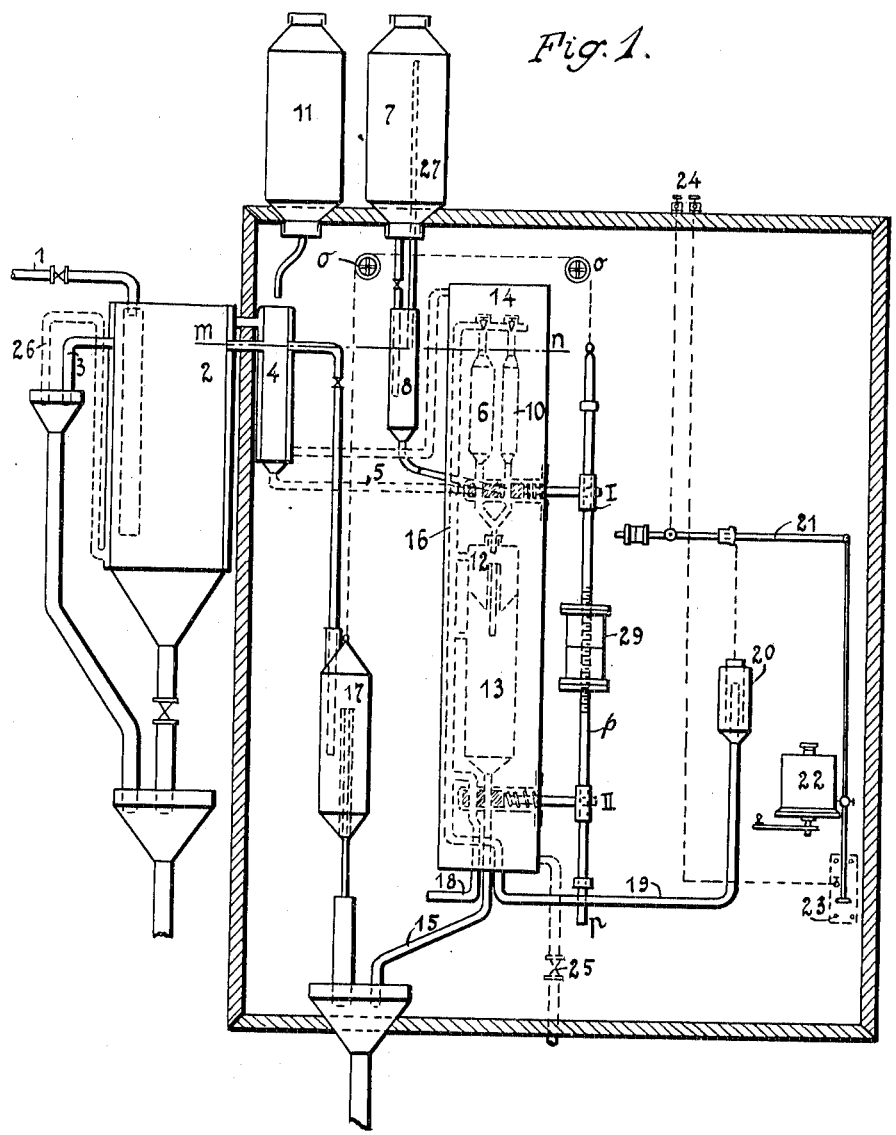
Figure 2:
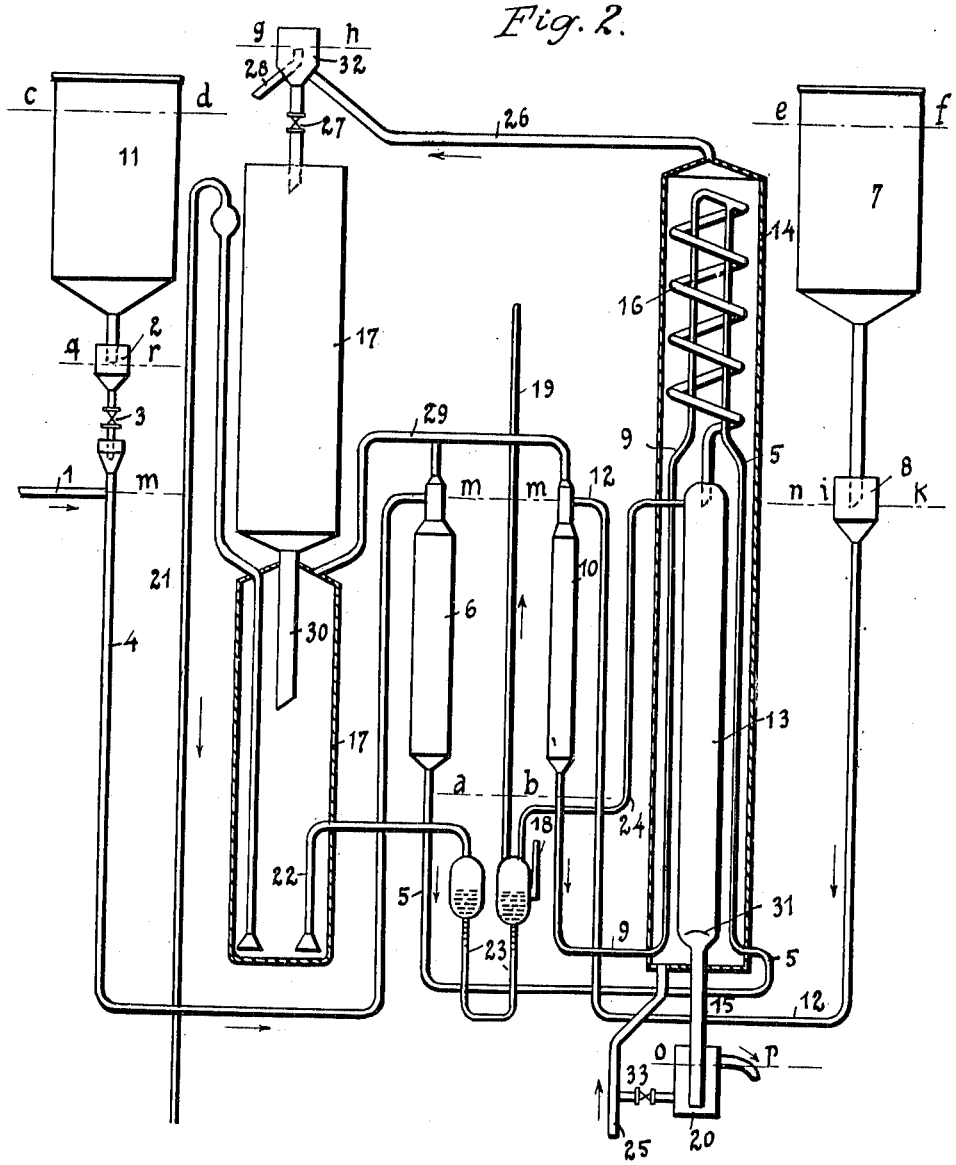

Figure 1 is a longitudinal section of an apparatus in which the actuating mechanism is constituted by a siphon device fed continuously with liquid, and serves to actuate two three-way cocks that control the above described operations. Fig. 2 is a similar view of a modification, and Fig. 3 is a similar view of another modification.

The working of the apparatus shown in Fig. 1 is as follows: The liquid to be examined passes from a pipe 1 into a clarifying vessel 2 through a pipe inserted into and extending almost to the bottom of the latter. A portion of the clarified liquid then passes into a cooler 4. The excess of the clarified liquid flows off through a pipe 3 so that the liquid in the cooler 4 will always stand at the same level indicated by the line *m—n*. The liquid reagent passes from a second collecting vessel 7 which is closed at top, into a vessel 8 which can become filled only up to the level *m—n* owing to the action of a pipe 27 regulating the air supply. A double three-way cock I has a position such that a pipette 6 is in communication through a pipe 5 with the cooler 4, and the pipette 10 is in communication through a pipe 9 with the vessel 8 containing the liquid reagent. By this means the pipettes 6 and 10 constituting pipes in communication respectively with the vessels 4 and 8, are filled likewise up to the level *m—n* with the liquid to be examined and the liquid reagent respectively. While the pipettes 6 and 10 are being filled, the vessel 13 communicates through the cock II with the discharge pipe 15, while the air spaces of the pipettes 6 and 10, the reaction vessel 13, and the mixing vessel 12, communicate with atmosphere through pipe 16, cock II, and pipe 18, and the bell 20 communicates with atmosphere through pipe 19, cock II, and pipe 18.

The mixing of the liquids now contained in the pipettes 6 and 10, is to be effected in the vessels 12 and 13, the generated gas acting to raise the bell 20. For this purpose the double three-way cock I must be turned so that the pipettes 6 and 10 are brought into communication with the vessel 12, and the cock II must shut off the previous communication of the vessel 13 with the pipes 15 and 18. This is effected automatically by the following means:—The vessel 17 which is provided at a determined level with a siphon for siphoning out its entire contents of liquid when this level is reached, is fed continuously with a portion of the cooling water discharged from the cooler 4. The entire vessel 17 is attached by means of a cord or the like passing over two pulleys *o* to a counterweight 29 in such a manner that when the vessel 17 is filled up to the siphon level, the vessel 17 will have reached its lowest position, and the counterweight 29 will be in its highest position, whereas when the vessel 17 has been partly emptied by the automatic siphon, the counterweight 29 will be in its lowest position.

The counterweight 29 is mounted on a guide rod $p$, which is fitted with toothed wheels or the like and acts to turn the cocks I and II by its up and down movements. When the vessel 17 has become lighter in consequence of its partial emptying, so that the counterweight 29 has sunk and thereby turned the cocks I and II, the liquids will flow from the pipettes 6 and 10 together into the siphon vessel 12 whence after mixture they will be siphoned over into the vessel 13. Gas which will be generated in the vessel 13 and also in the vessel 12, will since the connection to pipes 18 and 15 is shut off, pass into the pipe 16, thereby causing an increase in volume which through the pipe 19 will cause the bell 20 to rise. In order to record continuously this measurable increase in volume, the bell 20 is suspended from a balanced lever 21, which records the quantity of generated gas or the increase in the gas pressure by means of a writing device directly upon a recording drum 22 that is driven by clockwork and is provided with suitably graduated recording sheets. An extension of the stem of the marking pen is connected to an electric contact 23 whereby when the lever 21 rises beyond a predetermined point, an electric bell is rung through contacts 24. In the meantime, the vessel 17 has gradually filled with water again, and becoming heavier sinks, and pulls up the counterweights so that the cocks I and II are turned back into their first positions. The whole of this operation is constantly repeated at determined intervals which are controlled by the flow of the cooling water from the cooler 4 into the vessel 17 and are regulated according to requirements.

The apparatus consisting of the pipettes 6 and 10 and the reaction vessels 12 and 13, may be surrounded by a cooling jacket, in which cooling water enters through the cock 25 and passes out at 14 into the jacket of the cooler 4, whence a part of the water flows into the jacket of the clarifying vessel 2 and runs off through the discharge pipe 26. The other part of the cooling water from the cooling jacket of the cooler 4 serves, as above stated, for operating the siphon vessel.

In the apparatus shown in Fig. 2, the motive power employed is compressed air which is produced in a siphon vessel operated periodically by a supply of liquid. The compressed air operates in its turn devices for shutting off liquid whereby the working operations are automatically controlled. The manner of operation of this form of apparatus is as follows:—The liquid to be examined enters in a clarified and cooled state in the pipe 1 which is provided at its upper end with a supply funnel. If the liquid to be examined must be further cleared and prepared, a reagent may be added drop by drop from a vessel 11 by means of the liquid sealed pipe 2 and cock 3. The liquid to be examined flows together with the clarifying liquid through the pipe 4 into the pipette 6 up to about the level $m$—$n$, because the liquid flows from the vessel 11 regularly and in drops into the pipe 4 and any excess flows off through the pipe 1. An excess may however be completely prevented by exact regulation of the upper cocks, so that the liquid will always remain at the level $m$—$n$. The liquid reagent passes from the vessel 7 fitted with a liquid sealing device 8, through the pipe 12 into the pipette 10 up to the level $m$—$n$. The upper ends of the pipettes 6 and 10 are connected by a pipe 29 to the pressure vessel 17. For the purpose of causing the two liquids in the pipettes 6 and 10 to pass through the pipes 5 and 9 into the reaction chamber 13, a part of the cooling water passes through the vessel 14 and the pipe 26 into the pressure vessel 17, wherein as soon as the continuously inflowing water has reached the air pipe 30 and is rising in the vessel 17, the said part of the cooling water exerts a pressure upon the surface of the liquid through the pipe 29 upon the contents of the pipettes 6 and 10. Consequently the liquids in the two pipettes 6 and 10 will be pressed through the pipes 5 and 9 and will flow mixed together through the coil 16 and fall in drops upon a watch glass 31 and thence out through the pipe 15, which is provided with a liquid seal 20. The reaction takes place in the chamber 13. The generated gas is measured by means of a pipe 19 as hereinafter described. The level in the seal 20 is maintained at a uniform height indicated by the line $o$—$p$, by a continuous supply of water from a pipe 25 controlled by means of a cock 33 and an overflow. As soon as the water in the pressure vessel 17 which has likewise a continuous supply from the pipe 27, has reached the lower end of the pipe 30, the contents of the two pipettes 6 and 10 are forced slowly and uniformly to the level $a$—$b$ through the pipes 5 and 9. At this moment the siphon 21 which is movable vertically and is suitably adjusted, and into which the compressed air has forced up the liquid, empties the vessel 17 to the bottom by suction. Meanwhile the liquid in the pipettes 6 and 10 and in the pipes 4 and 12 rises again to the level $m$—$n$, since the pipe 29 is opened and the pressure is balanced by that of the atmosphere.

For the purpose of avoiding a premature recording, a seal is provided between the pipe 24 connecting the pipe 19 with the reaction chamber 13 and the pipe 13 connecting the pipe 19 with the atmosphere. This seal is formed by one limb of the spherically enlarged and prolonged U-tube 23 being carried down inside the pressure vessel 17 almost to the bottom, and the other limb being connected with the pipes 19, 24 and 18. The U-tube contains mercury or other suitable sealing liquids. When the water rises in the vessel 17 pressure acts through the pipe 22 upon the mercury in the U-tube 23, so that the mercury in the right limb shuts off the atmosphere at pipe 18, and also breaks the connection between the reaction chamber 13 and the recording device which receives its operating pressure through the pipe 19. The continuous flow of water for producing pressure in the vessel 17 passes through the pipe 25 through the cooling jacket 14 through the pipe 26 into the overflow vessel 32, where the excess water is carried off by the overflow 28, the remainder of the water flowing through the cock 27 into the vessel 17. As soon as the vessel 17 has been emptied by the siphon 21, the liquids gradually assume the level $m$—$n$ in the pipettes 6 and 10. The connection between the pipe 19 and the pipe 24 is also established, because the pressure in the pipe 22 falls, whereupon the recording, or the indicating of the increase in volume, takes place. After the greater part of the water has been siphoned out of the pressure vessel 17, the atmospheric pipe 18 is opened also, whereupon the excess pressure above the atmospheric passes out through the pipe 18, and the recording or indicating device comes back to zero, and the apparatus is then ready for a fresh test.

Instead of causing a source of power provided with automatic control to act directly as shown in Fig. 1, the said source may be caused to bring into operation indirectly devices for shutting off the liquids, such as for instance by raising and lowering vessels containing liquids, as in the example shown in Fig. 3. In this example the vessels I, II, III containing liquids, are raised and lowered by a source of power, so that the source of power operates indirectly the devices for shutting off the liquids. The pipettes 6 and 10 are connected with each other by a tube 30 and also with the vessel I containing mercury. The pipettes 6 and 10 are filled with mercury up to the levels $m_1$—$n_1$. The well-known power siphon mechanism which passes over the two pulleys 31 and 32 raises the mercury vessel I by means of the tappet 33. Hereupon the mercury rises in the pipettes 6 and 10 and also in the pipes 34 and 35 to the level $m$—$n$, so that the liquid reagent and the solution to be examined flow through the pipes 36 and 37 into the reaction chamber 12, 13.

The air pipe 38 and the discharge pipe 15 are shut off by means of the vessel 39 which communicates with the movable vessel II and is partly filled with mercury. This shutting off is effected by the mercury which flows in when the vessel II is raised. The shutting off of the pipes 38 and 15 takes place with an advance, that is, the vessel II rises before the vessel I rises and before the liquids flow out of the pipettes 6 and 10 through the pipes 36 and 37. The generated gas passes through the pipe 19 to the bell of the gasholder not shown in the drawing.

The increase in volume produced by the bringing together of the solution to be examined and the liquid reagent, is compensated by means of the mercury filled vessel III and the pipette 40. Its volume is equal to the sum of the capacities of the pipettes 6 and 10. The pipette 40 is filled with mercury to the level indicated by the letter $x$ and is connected at its lower end by a rubber pipe with the vessel III and at its upper end by a narrow pipe with the reaction chamber 13. As the vessels I and II rise, the vessel III descends, and mercury flows out of the pipette 40 to the level O whereby the corresponding increase in volume is compensated.

By means of regulating screws 41 and the determination of the highest and lowest levels in the vessels I and III, the outflow of the liquids from the vessel I is accurately fixed, and an exact compensation of the increase in volume is effected in the vessel III.

The following are given as example of the liquids to be examined and the reagents used:—

(1) When determining the amount of nitrogen contained in liquids containing, for instance, ammonia compounds such as ammonia chlorid, the liquid is mixed with an alkaline hypobromite or hypochlorite solution acting as reagent. Nitrogen is liberated according to the equation, $$2NH_4Cl + 3NaBrO + 2NaOH = 2N + 2NaCl + 3NaBr + 5H_2O.$$

The amount of this nitrogen is then measured and recorded.

(2) For the purpose of determining the amount of chlorin contained in chlorid of lime solutions, the particular solution is mixed with hydrogen peroxid acting as reagent, a quantity of oxygen, which is equivalent to the amount of chlorin contained in the liquid, is set free in accordance with the equation, $$CaOCl_2 + H_2O_2 = CaCl_2 + H_2O + 2O.$$

In a similar manner, many other bleaching liquors can be analyzed.

(3) By mixing acids with carbonate of an alkali, carbonic acid is liberated by which means the alkalinity or acidity of the one or the other liquid may be determined.

Having now described our invention what we claim as new and desire to secure by Letters Patent is:—

1. In apparatus for effecting the continuous examination of the composition of a liquid, the combination of a measuring vessel for the liquid to be examined, a measuring vessel for a liquid reagent, a reaction chamber receiving the measured quantities of liquids from the measuring vessels, means for causing at determined intervals of time the entrance of the liquids from the measuring vessels into the reaction chamber, means for measuring the volume of generated gas and means for discharging the consumed liquids.

2. In apparatus for effecting the continuous examination of the composition of a liquid, the combination of a measuring vessel for the liquid to be examined, a measuring vessel for a liquid reagent, a reaction chamber receiving the measured quantities of liquids from the measuring vessels, shutting-off devices controlling the connections between the measuring vessels and the reaction chamber and between the reaction chamber and the outlet for the liquids and gases generated in said chamber and actuating mechanism for controlling said shutting-off devices.

3. In apparatus for effecting the continuous examination of the composition of a liquid, the combination with a reaction chamber, of a pressure vessel adapted to be filled periodically with a continuously supplied liquid, and to be emptied automatically by means of a siphon, pipettes containing respectively the liquid to be examined and a liquid reagent, a pipe connecting the pressure vessel with the pipettes, for supplying the latter periodically with compressed air, a siphon like pipe connecting the pressure vessel with one limb of a U-shaped liquid seal, the other limb being connected by one pipe with the atmosphere, by a second pipe with the reaction chamber, and by a third pipe with the recording device, whereby an equalization of pressure is effected successively between the reaction chamber and the atmosphere and between the reaction chamber and the recording device.

4. In apparatus for effecting the continuous examination of the composition of a liquid, the combination with a reaction chamber of a pressure vessel adapted to be filled periodically with a continuously supplied liquid, and to be emptied automatically by means of a siphon, pipettes containing respectively the liquid to be examined and a liquid reagent, a pipe connecting the pressure vessel with the pipettes for supplying the latter periodically with compressed air, a siphon like pipe connecting the pressure vessel with one limb of a U-shaped liquid seal, the other limb being connected by one pipe with the atmosphere, by a second pipe with the reaction chamber, and by a third pipe with a recording device and the pipe connected to the reaction chamber extending into a liquid seal that is constantly supplied and maintained at a determined level, whereby the reaction chamber is being continuously and automatically emptied of liquid.

5. In apparatus for effecting the continuous examination of the composition of a liquid, the combination with a reaction chamber, of a pressure vessel, adapted to be filled periodically with a continuously supplied liquid, and to be emptied automatically by means of a siphon, pipettes containing respectively the liquid to be examined and a liquid reagent, a pipe connecting the pressure vessel with the pipettes, for supplying the latter periodically with compressed air, a siphon-like pipe connecting the pressure vessel with one limb of a U-shaped liquid seal, the other limb being connected by one pipe with the atmosphere, by a second pipe with the reaction chamber, and by a third pipe with the recording device, a water-cooled jacket surrounding the reaction chamber, a common spiral tube, connected to the reaction chamber and to pipes leading from the pipettes.

6. In apparatus for effecting the continuous examination of the composition of a liquid, the combination with the reaction chamber of a pressure vessel adapted to be filled periodically with a continuously supplied liquid, and to be emptied automatically by means of a siphon, pipettes containing respectively the liquid to be examined and the liquid reagent, a pipe connecting the pressure vessel with the pipettes for supplying the latter periodically with compressed air, a siphon like pipe connecting the pressure vessel with one limb of the U-shaped liquid seal, the other limb being connected by one pipe with the atmosphere, by a second pipe with the reaction chamber and by a third pipe with the recording device, and an impact surface located in the reaction chamber, upon which the mixture of liquids impinges.

In testimony, that we claim the foregoing as our invention, we have signed our names in presence of two subscribing witnesses.

OTTO FRIESE.
FERDINAND GRAAFEN.

Witnesses to signature of Otto Friese:
 WOLDEMAR HAUPT,
 HENRY HASPER.

Witnesses to signature of Ferdinand Graafen:
 GUSTAVE BECKER,
 RUDOLF DISSMAN.